(12) United States Patent
Pearman et al.

(10) Patent No.: US 11,177,584 B1
(45) Date of Patent: Nov. 16, 2021

(54) FEMALE WELDING LEAD CONNECTOR INCLUDING SAFETY FLIP COVER

(71) Applicant: Alpha/Omega Energy Solutions, LLC, Cumberland Gap, TN (US)

(72) Inventors: Bradley Lance Pearman, Cumberland Gap, TN (US); Kenny Lavelle Miller, Madeira Beach, FL (US)

(73) Assignee: Alpha/Omega Energy Solutions, LLC, Cumberland Gap, TN (US)

( * ) Notice: Subject to any disclaimer, the term of this patent is extended or adjusted under 35 U.S.C. 154(b) by 0 days.

(21) Appl. No.: 17/190,636

(22) Filed: Mar. 3, 2021

(51) Int. Cl.
| | |
|---|---|
| *B23K 9/32* | (2006.01) |
| *H01R 4/22* | (2006.01) |
| *H01R 4/00* | (2006.01) |
| *H01R 4/70* | (2006.01) |
| *H01R 13/213* | (2006.01) |
| *H01R 13/639* | (2006.01) |
| *H01R 13/627* | (2006.01) |
| *H01R 13/52* | (2006.01) |

(52) U.S. Cl.
CPC ............... *H01R 4/22* (2013.01); *B23K 9/32* (2013.01); *H01R 4/54* (2013.01); *H01R 13/213* (2013.01); *H01R 13/5213* (2013.01); *H01R 13/627* (2013.01); *H01R 13/639* (2013.01)

(58) Field of Classification Search
CPC ... B23K 9/32; B23K 9/10; H01R 3/00; H01R 4/54; H01R 4/22; H01R 4/00; H01R 4/70; H01R 13/5213; H01R 13/213; H01R 13/639; H01R 13/627; H01R 13/6275; H01R 13/6397; H01R 13/516; H01R 13/518; H01R 13/60; H01R 13/701; H01R 33/97; H01R 35/00; E05B 37/00
USPC .................... 174/138 F, 84 R; 439/164, 133
See application file for complete search history.

(56) References Cited

U.S. PATENT DOCUMENTS

| | | |
|---|---|---|
| 2,518,289 A | 4/1950 | Cox |
| 2,873,357 A | 2/1959 | Landis |
| 2,980,790 A | 4/1961 | Bracken |
| 3,226,667 A | 12/1965 | Senior |
| 4,702,539 A | 10/1987 | Cusick |
| 5,052,939 A | 10/1991 | Koch |
| 5,061,194 A | 10/1991 | Herman et al. |
| 5,129,839 A | 7/1992 | Vanskiver |
| 5,139,429 A | 8/1992 | Herman et al. |

(Continued)

FOREIGN PATENT DOCUMENTS

| | | |
|---|---|---|
| CA | 552341 | 1/1958 |
| CA | 2485302 | 6/2005 |

(Continued)

OTHER PUBLICATIONS

PCT International Search Report for PCT App. No. PCT/US2021/027685 dated May 12, 2021.

(Continued)

*Primary Examiner* — Timothy J Thompson
*Assistant Examiner* — Guillermo J Egoavil
(74) *Attorney, Agent, or Firm* — Robinson IP Law, PLLC

(57) ABSTRACT

A female welding lead connector including a safety cover hingedly connected to a main body of the female welding lead connector. The safety cover preferably includes a fastener for fastening the cover to a closed position, shielding a female welding lead receptacle inside the main body of the female welding lead connector.

4 Claims, 5 Drawing Sheets

(56) References Cited

U.S. PATENT DOCUMENTS

| | | | |
|---|---|---|---|
| 5,217,387 A | 6/1993 | Hull et al. | |
| 5,506,922 A * | 4/1996 | Grois | G02B 6/3825 |
| | | | 385/75 |
| 5,525,073 A | 6/1996 | Sampson | |
| 5,685,730 A | 11/1997 | Cameron | |
| 5,821,462 A | 10/1998 | Raleigh | |
| 5,844,171 A | 12/1998 | Fitzgerald | |
| 6,184,492 B1 | 2/2001 | Busopulos | |
| 6,848,926 B2 | 2/2005 | Ling | |
| 6,935,871 B2 | 8/2005 | Maurer | |
| 7,077,681 B2 | 7/2006 | Behoo | |
| 7,285,725 B1 | 10/2007 | Saman | |
| 7,384,297 B2 | 6/2008 | King, Jr. et al. | |
| 7,431,611 B2 | 10/2008 | King, Jr. et al. | |
| 8,408,929 B2 | 4/2013 | Solon | |
| 9,211,602 B1 | 12/2015 | Carney et al. | |
| 10,056,745 B2 | 8/2018 | Nooner et al. | |
| 10,431,930 B1 * | 10/2019 | Pearman | H02G 15/113 |
| 10,720,731 B2 * | 7/2020 | Pearman | B23K 9/32 |
| 2002/0092837 A1 | 7/2002 | Keats | |
| 2004/0097120 A1 | 5/2004 | Limber et al. | |
| 2004/0123997 A1* | 7/2004 | Drane | H02G 3/14 |
| | | | 174/67 |
| 2004/0144758 A1 | 7/2004 | Onishi | |
| 2005/0136716 A1* | 6/2005 | Behoo | H01R 13/213 |
| | | | 439/164 |
| 2007/0037430 A1 | 2/2007 | Evans | |
| 2007/0072461 A1* | 3/2007 | Williams | H01R 13/639 |
| | | | 439/144 |
| 2012/0064744 A1 | 3/2012 | Messner | |
| 2013/0119041 A1 | 5/2013 | Humenik | |
| 2013/0212842 A1 | 8/2013 | Rigollet et al. | |
| 2014/0038439 A1 | 2/2014 | Lee | |
| 2015/0069114 A1 | 3/2015 | Sunger et al. | |
| 2015/0325940 A1 | 11/2015 | Foseide | |
| 2016/0024818 A1 | 1/2016 | Allen | |
| 2017/0087658 A1 | 3/2017 | Townsend | |
| 2017/0110831 A1 | 4/2017 | Su | |
| 2018/0166871 A1 | 6/2018 | Nooner et al. | |
| 2020/0198485 A1 | 6/2020 | Schwan | |

FOREIGN PATENT DOCUMENTS

| | | |
|---|---|---|
| EP | 0918590 | 12/2002 |
| GB | 907905 | 10/1962 |
| GB | 931500 | 7/1963 |
| GB | 1327584 | 8/1973 |
| WO | 9749519 | 12/1997 |
| WO | 2015047552 | 4/2015 |

OTHER PUBLICATIONS

Written Opinion of the International Searching Authority for PCT App. No. PCT/US2021/027685 dated May 12, 2021.
Spec Sheet for Eureka HD Series Pin and Sleeve Electrical Connector available at the URL https://www.elecdirect.com/media/specsheets/100-Amp-Pin-And-Sleeve-Connectors-Watertight.pdf.

* cited by examiner

FEMALE WELDING LEAD CONNECTOR INCLUDING SAFETY FLIP COVER

FIELD

This disclosure relates to the field of welding. More particularly, this disclosure relates to female welding lead connectors.

BACKGROUND

Welding leads (or "welding cable") is an electrical conductor for transmitting a welding current used for welding materials together (e.g., for arc welding or resistance welding). Welding leads typically include small copper strands wrapped together inside a nonconductive outer layer. Such leads typically have enlarged ends in the form of cable connectors wherein one end is typically a male end and the other a female end with both male and female features being highly conductive.

Welding leads can be both dangerous and expensive. Some dangers include potential electrocution if the connection between a first welding lead cable connector connected to a second welding leads cable connector becomes loose and conductive material is exposed outside or otherwise being the nonconductive outer layer of the welding leads. Unconnected welding lead connectors that are open and exposed can be particularly dangerous if the welding lead is "live" with current flowing through the welding lead. Usually, female welding lead connectors are the welding lead connector that provides power for welding. Therefore, female welding lead connectors pose the most risk of electrocution or electrical arcing.

What is needed, therefore, is device and method to overcome the issues mentioned above related to common welding leads.

SUMMARY

The above and other needs are met by a female welding lead connector comprising a flip cover connected to a main body. More specifically, a female welding lead connector is disclosed comprising a welding lead connector main body including a first end and a second end wherein the first end includes a female receptacle for engaging with a male welding lead connector; a cover hingedly connected to the first end of the welding lead connector main body wherein the cover is free to rotate either from a closed position in which the cover shields the female receptacle to an open position in which a male welding lead connector can be received into the female receptacle, or from an open position in which a male welding lead connector can be received into the female receptacle to a closed position in which the cover shields the female receptacle.

The female welding lead connector preferably further comprises a biasing apparatus to either bias the cover to the open position or bias the cover to the closed position. The biasing apparatus preferably comprises a torsion spring.

The female welding lead connector preferably comprises a fastener further comprising a male member extending out along a distal edge of the first end of the welding lead connector main body; and a female member along a distal edge of the cover for receiving and engaging with the male member when the cover is in the closed position. The male member preferably further comprises a two-pronged clip and the female member preferably further comprises a gap along the distal edge of the cover.

In an alternative embodiment, the female welding lead connector preferably comprises a fastener further comprising a male member extending out along a distal edge of the cover; and a female member along a distal edge of the first end of the welding lead connector main body for receiving and engaging with the male member when the cover is in the closed position. The male member preferably further comprises a two-pronged clip and the female member preferably further comprises a gap along the distal edge of the first end of the welding lead connector main body.

The female welding lead connector preferably further comprises a tab extending out from the distal edge of the cover to provide a ridge for traction to help open the cover using a finger.

The summary provided herein is intended to provide examples of particular disclosed embodiments and is not intended to cover all potential embodiments or combinations of embodiments. Therefore, this summary is not intended to limit the scope of the invention disclosure in any way, a function which is reserved for the appended claims.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

The figures are provided to illustrate concepts of the invention disclosure and are not intended to embody all potential embodiments of the invention. Therefore, the figures are not intended to limit the scope of the invention disclosure in any way, a function which is reserved for the appended claims.

DETAILED DESCRIPTION

Figure 1:
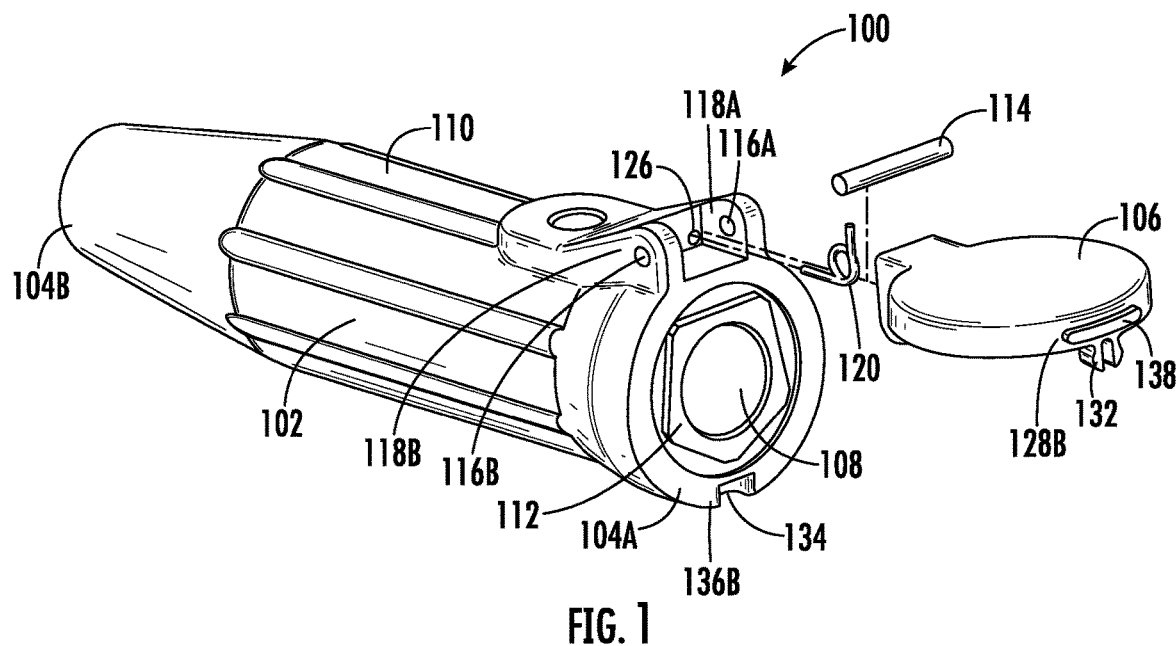
FIG. 1 shows a first perspective exploded view of a female welding lead connector including a main body, a cover, a biasing apparatus, and a pin.
Figure 2:
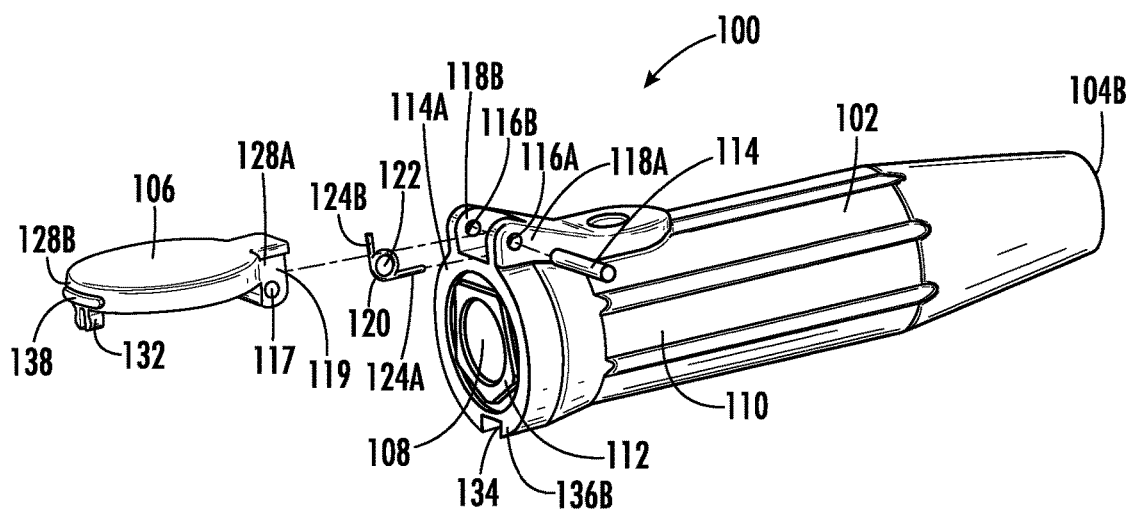
FIG. 2 shows a second perspective exploded view of the female welding lead connector shown in FIG. 1.
Figure 3:
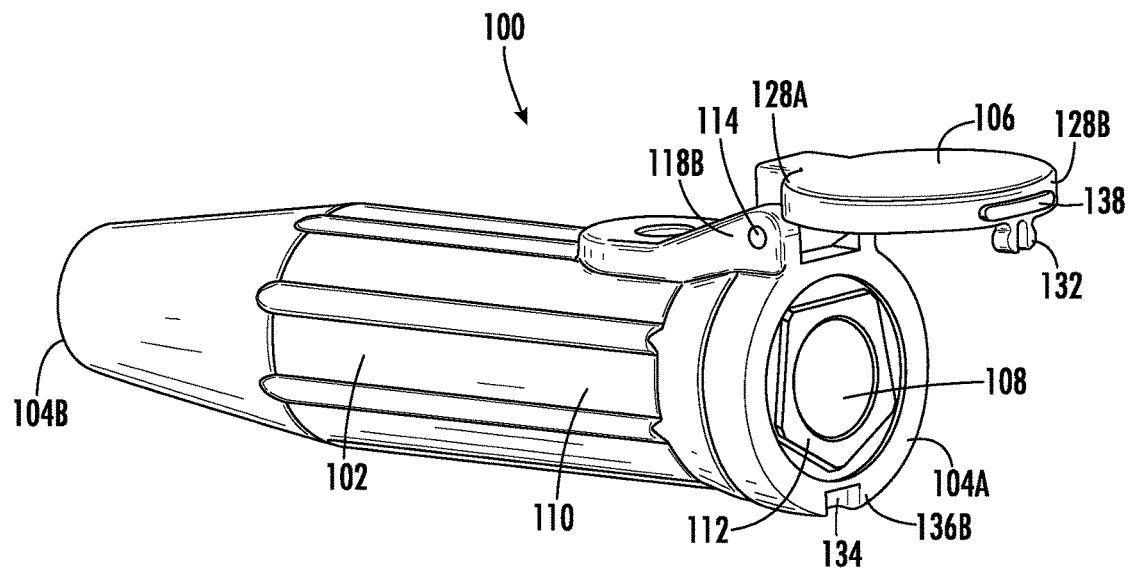
FIG. 3 shows a third perspective view of a fully assembled version of the female welding lead connector shown in FIG. 1 and FIG. 2 including a cover hingedly attached to a main body of the female welding lead connector with the cover in an open position.
Figure 4:
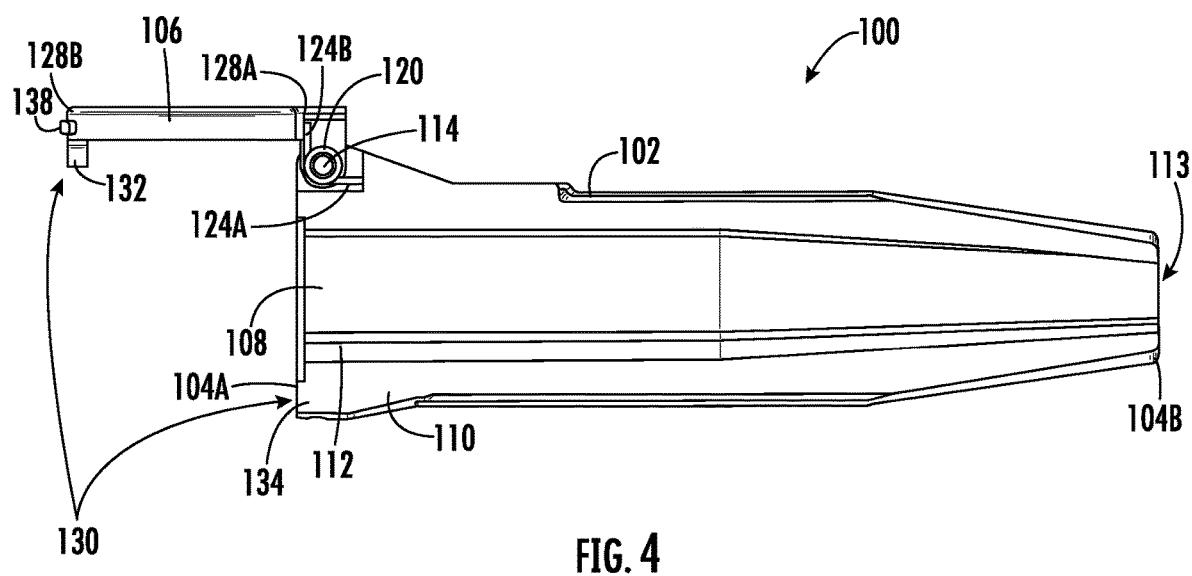
FIG. 4 shows a side view of the female welding lead connector shown in FIGS. 1-3 with the cover in an open position.
Figure 5:
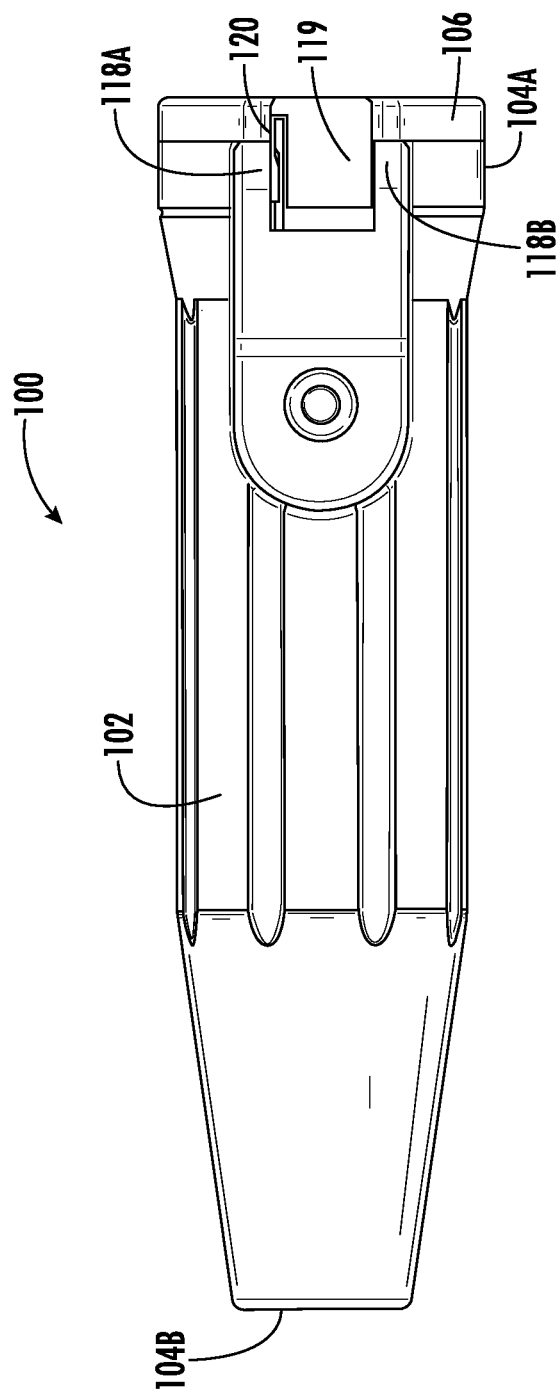
FIG. 5 shows a plan view of the female welding lead connector from FIGS. 1-4 with the cover in a closed position.

FIGS. 1-7 show various views of an embodiment of a female welding lead connector 100. FIG. 1 shows an exploded view from a first perspective of the female welding lead connector 100 in a disassembled configuration and FIG. 2 shows an exploded view from a second perspective of the female welding lead connector 100 in a disassembled configuration. FIG. 3 shows a perspective view of the fully assembled welding lead connector 100, FIG. 4 shows a cross-sectional side view of the fully assembled welding lead connector 100, and FIG. 5 shows a plan view of the fully assembled welding lead connector.

The female welding lead connector 100 includes a main body 102 including a first end 104A and a second end 104B. A cover 106 is hingedly connected to the main body 102 proximate the first end 104A of the main body 102. The cover 106 is preferably round and preferably completely covers the first end 104A of the main body 102 when the cover 106 is in a closed position as shown, for example, in FIG. 5 and FIG. 7. The hinge connection between the main body 102 and the cover 106 permits the cover 106 to rotate from the closed position to an open position (shown in FIG. 3 and FIG. 4) or from the open position to the closed position. When the cover 106 is in the open position, a male welding lead connector can be inserted into a female receptacle 108 of the female welding lead connector 100. When the cover 106 is in the closed position, the cover 106 shields the female receptacle 108, thereby diminishing the chance of an electrical arc or electrocution to a bystander.

The main body 102 preferably includes an external shell 110 made of nonconductive material (such as, for example, rubber or plastic) and an internal core 112 made of conductive material. The cover 106 is preferably made of nonconductive material (such as, for example, rubber or plastic). The internal core 112 includes the female receptacle 108. A welding lead can be connected to the female welding lead connector 100 through an aperture 113 along the second end 104B of the main body.

The hinge connection between the main body 102 and the cover 106 preferably includes a pin 114 which is inserted through a main body first aperture 116A, a cover aperture 117, and a main body second aperture 116B. The main body first aperture 116A is located in a main body first appendage 118A and the main body second aperture is located in a main body second appendage 118B. The cover aperture 117 is located in a cover appendage 119 used to connect the cover 106 to the main body 102. A biasing apparatus 120 is preferably used to either bias the cover 106 in the open position or in the closed position. The biasing apparatus 120 is preferably a torsion spring including an open center 122 through which the pin 114 is inserted. A first leg 124A of the torsion spring is preferably inserted into a main body small cavity 126 as shown in FIG. 1 and FIG. 4, and a second leg 124B of the torsion spring is preferably inserted into or proximate to a proximal edge 128A of the cover 106.

Figure 6:
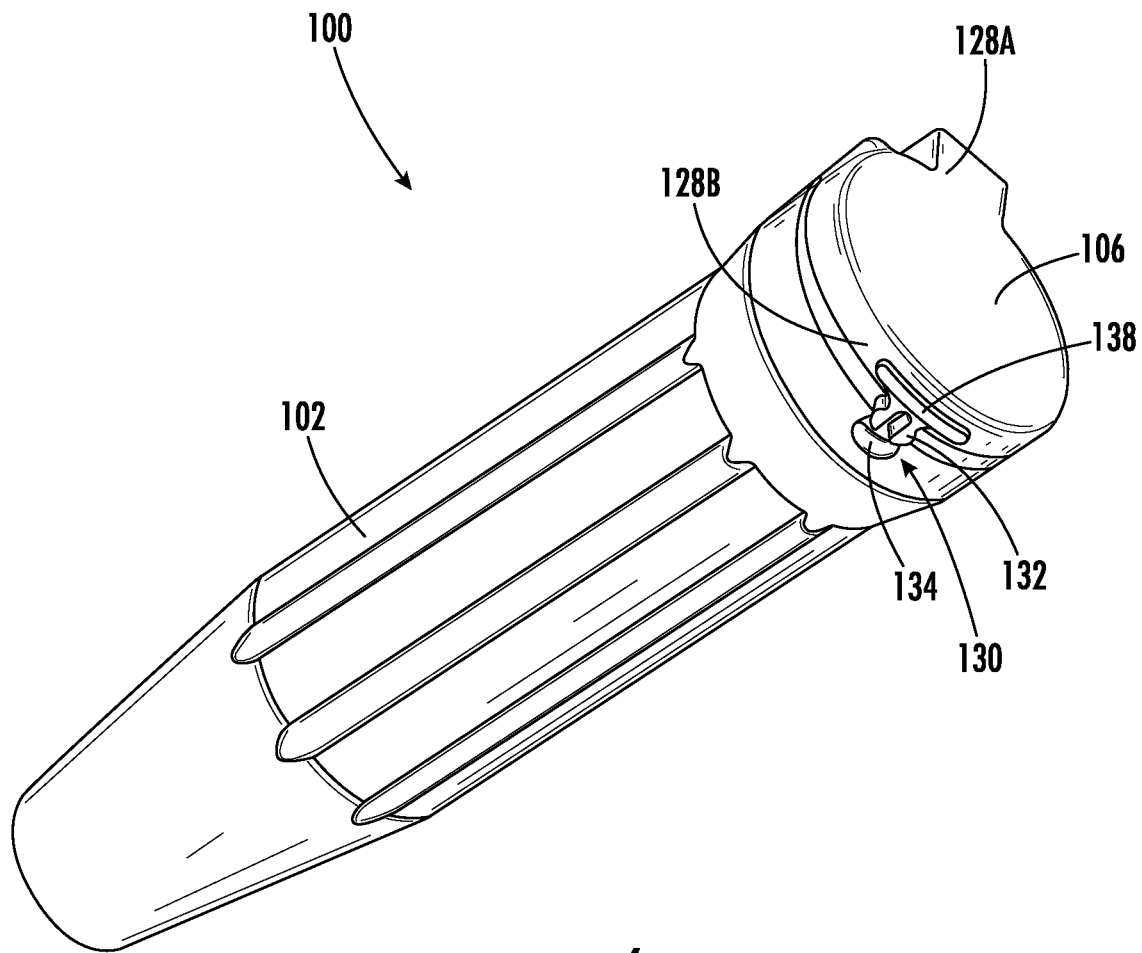
FIG. 6 shows a fourth perspective view of the female welding lead connector from FIGS. 1-5 showing the cover slightly open.
Figure 7:
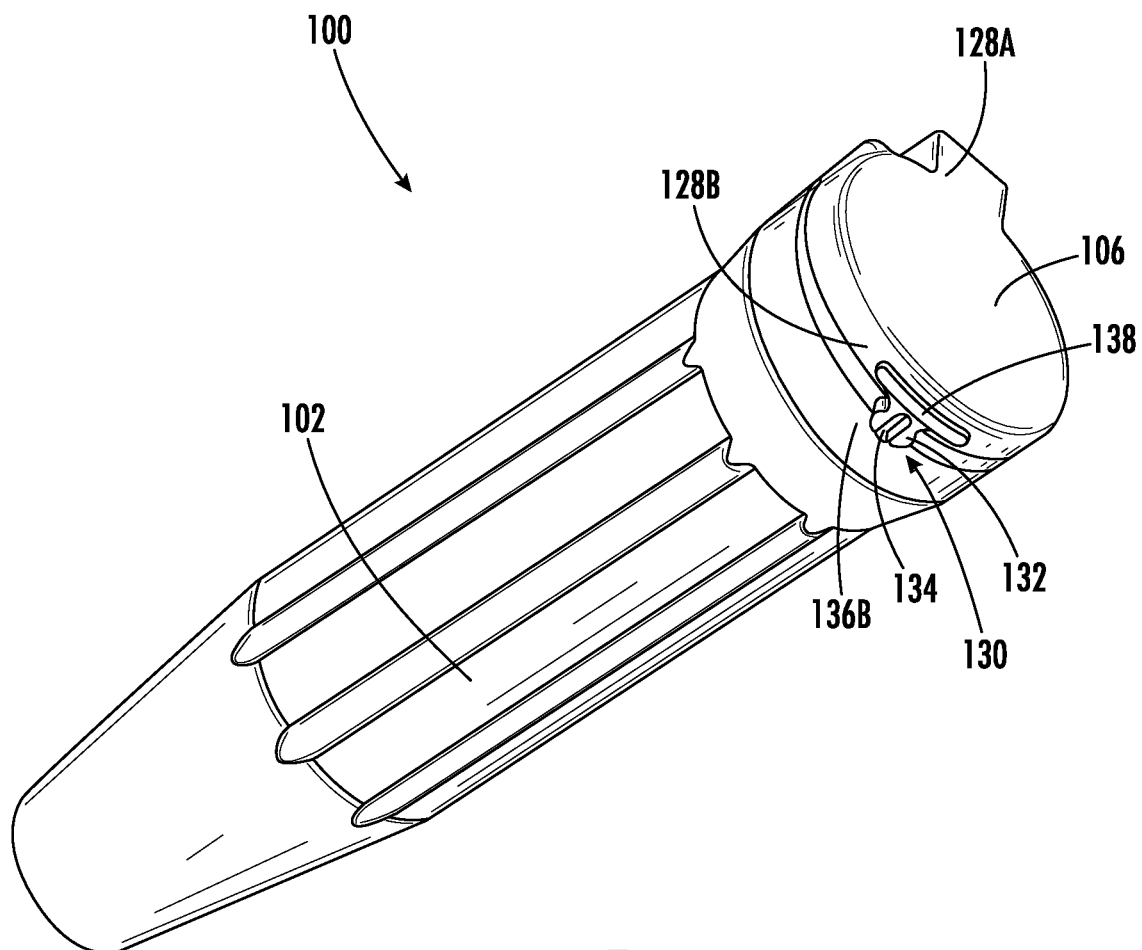
FIG. 7 shows a fifth perspective view of the female welding lead connector from FIGS. 1-5 showing the cover fully fastened in a closed position.

The cover 106 preferably includes a fastener 130 including a male member 132 extending out orthogonally from a distal edge 128B of the cover 106 and a female member 134 located along a distal edge 136B of the first end 104A of the main body 102. The male member 132 and female member 134 are configured to mechanically engage with one another to secure the cover 106 in the closed position when it is closed. The male member is preferably a two-pronged clip and the female member is preferably a gap along the distal edge 136B of the first end 104A of the main body 102. FIG. 6 shows the cover 106 in an almost closed position right before the male member 132 engages with the female member 134, and FIG. 7 shows the female welding lead connector 100 after the cover 106 has been closed to the closed position wherein the male member 132 is physically engaged with the female member 134. The terms "distal" and "proximal" as used in this context are referring to positions relative to the hinged connection between the cover 106 and the main body 102.

The cover 106 preferably further includes a tab 138 extending out radially from the distal edge 128B of the cover 106. The tab 138 is present to provide traction for a user's finder to open the cover to an open position.

The previously described embodiments of the present disclosure have many advantages. One advantage is the significant increase in safety created by shielding the female receptacle 108 using the cover 106 to prevent contact with the female receptacle 108 from outside the cover 106 when the female welding lead connector 100 is not in use. Even if a contemporary female welding lead connector is not in use, it can still have a current of electricity flowing to it, creating an electrocution and electric arcing risk. The female welding lead connector 100 including the cover 106 as described herein significantly reduces this risk because it blocks access to the internal core 112 of the female welding lead connector. The biasing apparatus 120 is an advantage because it can either be configured to bias the cover 106 in the open position or bias the cover 106 in the closed position. The tab 138 provides a way to more easily open the cover 106 to the open position when engaging the female welding lead connector 100 with a male welding lead connector. The fact that the cover 106 is connected to the main body 102, forming a part of the female welding lead connector 100, is advantageous over using some type of separate plug or other separate device which could easily be misplaced or unavailable because it does not form part of the female welding lead connector. By making the cover 106 a part of the structure of the female welding lead connector 100, the cover 106 is always readily available as a safety feature.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

Any element in a claim that does not explicitly state "means for" performing a specified function, or "step for" performing a specific function, is not to be interpreted as a "means" or "step" clause as specified in 35 U.S.C. § 112, ¶6. In particular, the use of "step of" in the claims herein is not intended to invoke the provisions of 35 U.S.C. § 112, ¶6.

What is claimed is:

1. A female welding lead connector comprising:
   a. a welding lead connector main body including a first end and a second end wherein the first end includes a female receptacle for engaging with a male welding lead connector;
   b. a cover hingedly connected to the first end of the welding lead connector main body wherein the cover is free to rotate either from a closed position in which the cover shields the female receptacle to an open position in which a male welding lead connector can be received into the female receptacle, or from an open position in which a male welding lead connector can be received into the female receptacle to a closed position in which the cover shields the female receptacle; and c. a fastener comprising (i) a male member comprising a two-pronged clip extending out along a distal edge of the cover; and (ii) a female member comprising a gap along a distal edge of the first end of the welding lead connector main body for receiving and engaging with the male member when the cover is in the closed position.

2. The female welding lead connector of claim 1 further comprising a biasing apparatus to either bias the cover to the open position or bias the cover to the closed position.

3. The female welding lead connector of claim 2 wherein the biasing apparatus comprises a torsion spring.

4. The female welding lead connector of claim 1 further comprising a tab extending out from the distal edge of the cover.

\* \* \* \* \*